Figure 1:
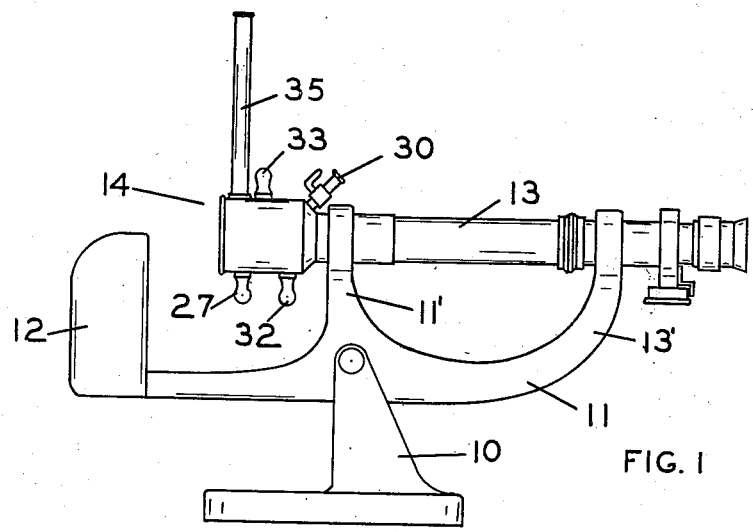

June 15, 1937.  J. W. FORREST  2,083,778
REFRACTOMETER
Filed Jan. 18, 1935

JOHN W. FORREST
INVENTOR

BY *G. A. Ellestad*
ATTORNEY

Patented June 15, 1937

2,083,778

UNITED STATES PATENT OFFICE 2,083,778

REFRACTOMETER

John W. Forrest, Brighton, N. Y., assignor to Bausch & Lomb Optical Company, Rochester, N. Y., a corporation of New York Application January 18, 1935, Serial No. 2,386

6 Claims. (Cl. 88—14)

The present invention relates to refractometers and has particular reference to dipping refractometers for measuring the index of refraction of liquids.

In the manufacture of dipping refractometers, it has heretofore been the practice to fix the dipping prism in the end of the telescope tube and the fluid chamber, a metal cup with a transparent bottom, is detachably connected to the telescope tube over the dipping prism. In order to get the fluid at the desired temperature, the fluid chamber and prism are then immersed in a water bath with the hypotenuse of the prism facing downwardly. The temperature of the water bath is then measured and the fluid is assumed to be at the same temperature.

This system has certain inherent disadvantages. It is almost impossible to obtain a fluid tight joint between the transparent cup fluid chamber and the refractometer body and hence there is always the danger of dilution of the fluid by the water of the bath. Another disadvantage lies in the fact that the cup is removable. The outer end of the dipping prism tapers to a fine edge and this edge is frequently broken during the putting on or removal of the cup. The glass and metal cup is unsuitable as a fluid chamber due to its low thermal conductivity and the temperature reading taken in the water bath may or may not be the temperature of the fluid. Still another disadvantage is that the prism faces downwardly. In this position air bubbles will rise to the face of the prism and cause errors in the reading. The fact that the illuminating beam must pass through the water of the bath is another disadvantage.

The present invention has for an object the provision of a new and improved refractometer for fluids. Another object is to provide a new and improved fluid chamber for a refractometer. A further object is to provide a dipping refractometer in which the prism is fixed in the fluid chamber. A further object is to provide a refractometer fluid chamber having high thermal conductivity. Still another object is to provide a fluid chamber having a water jacket. A still further object is to provide a refractometer fluid chamber in which the temperature of the fluid is measured at a point adjacent the prism face. A further object is to provide a refractometer in which the prism faces upwardly. These and other objects and advantages reside in certain novel features of construction, arrangement and combination of parts as will hereinafter be more fully set forth and pointed out in the appended claims.

Figure 2:
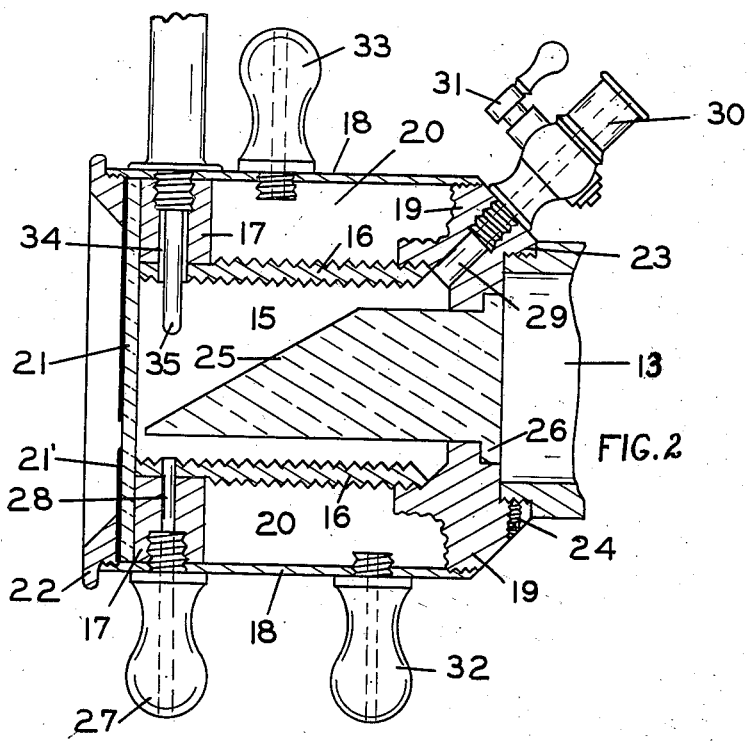

Referring to the drawing:

Fig. 1 is a side elevation of a dipping refractometer embodying my invention and Fig. 2 is an enlarged vertical section of my improved fluid chamber.

One embodiment of this invention is illustrated in the drawing wherein 10 indicates a refractometer base pivotally supporting a bracket 11 carrying a lamp house 12 and a telescope 13. The fluid chamber assembly indicated generally at 14 is mounted on the end of the telescope 13. The bracket 11 has two arms 11' and 13' which support the telescope 13 at the center of weight and adjacent the eyepiece respectively.

The fluid chamber 15 has a tubular wall 16 of metal of high thermal conductivity such as copper and this wall is roughened on both sides to increase its surface area. An outwardly extending annular ring 17 is sweated over one end of the wall 16 and a second wall 18 of polished metal of low thermal conductivity such as brass is sweated over the outer surface of the ring 17 parallel to the wall 16. A second annular ring 19 is sweated on to both the wall 16 and the wall 18 enclosing a chamber 20 completely surrounding the fluid chamber 15. The end of the fluid chamber 15 adjacent the annular ring 17 is closed by a glass plate 21 and a diaphragm 21' which are held in position by a retaining member or nut 22 threaded into the wall 18.

The annular ring 19 has a threaded portion 23 for engaging the telescope 14 and is held in adjusted position by a set screw 24. The dipping prism 25 is cemented or otherwise fixed in the ring 19 so as to extend into the chamber 15 with its hypotenuse facing upwardly. The prism 25 is formed with a shoulder 26 and the joint between the prism 25 and the ring 19 forms a fluid tight closure for the other end of the chamber 15.

The fluid to be measured is introduced into the chamber through a tap 27 leading to the chamber 15 through a bore 28 in the ring 17. The ring 19 has a bore 29 opening into the chamber 15 and an outlet 30 under the control of a valve 31 is secured in the bore 29. Two taps 32 and 33 open into the water jacket 20 to form respectively an inlet and an outlet for the heating or cooling water. The ring 17 has a second bore 34 through which a thermometer 35 extends into the chamber 15 to a point adjacent the hypotenuse face of the prism 25.

In the refining of sugar the concentration of the sugar solution can be determined from the index of refraction of the solution. With the present apparatus it is easy and simple to determine the index of refraction of such a solution. The chamber 15 is filled through the tap 27 and the solution passes through the annular ring 17 thus avoiding the necessity of a soldered tube. The solution is then brought to the desired temperature by passing water through the water jacket 20 and this temperature is measured by the thermometer 35 adjacent the face of the prism 25. By introducing the solution below the prism 25 away from its hypotenuse, no air bubbles will form on the hypotenuse face to interfere with the readings. The chamber 15 is emptied through the outlet 30.

From the foregoing it will be apparent that I am able to attain the objects of my invention and provide a new and improved dipping refractometer having a more accurate temperature indicating system, in which the dipping prism is protected against damage and in which the illumination is greatly improved. Various modifications can, of course, be made without departing from the spirit of my invention or the scope of the appended claims.

I claim:

1. A refractometer comprising a fluid chamber, a window closing one end of said chamber, an annular ring secured at the other end of said chamber with its central opening substantially concentric with said chamber, a dipping prism secured in and closing said opening and extending into said chamber, a threaded portion on said ring concentric with said opening, a telescope threaded in said portion, and inlet and outlet means for admitting and removing fluid from said chamber.

2. In a refractometer, a fluid chamber having a fluid outlet, a window closing one end of said chamber, a diaphragm covering said window and having a small opening adjacent one wall of the chamber, an annular ring secured in the other end of the chamber with its central opening substantially concentric with said chamber, a dipping prism secured in and closing said opening and extending longitudinally into said chamber with its edge adjacent the opening in said diaphragm, a threaded portion on said ring concentric with said opening, a telescope threaded in said portion, and inlet and outlet means for admitting and removing fluid from said chamber.

3. In a refractometer a fluid chamber, a jacket surrounding said chamber, a ring extending between said jacket and said chamber for sealing said jacket and a dipping prism fixed in said ring and extending into said chamber.

4. In a refractometer a fluid chamber, a dipping prism fixed in said chamber, a wall surrounding said chamber to form a water jacket, a sealing ring extending between said chamber and said wall and a thermometer extending through said ring into said chamber to a point adjacent the face of said prism.

5. A fluid chamber for a refractometer comprising a wall of high thermal conductivity forming a chamber, a second wall surrounding said first wall and spaced therefrom to form a water jacket, a transparent window sealing one end of said chamber, a wall closing the other end of said chamber and a dipping prism fixedly mounted in said wall and extending into said chamber.

6. In a refractometer a fluid chamber having rough walls of high thermal conductivity, a water jacket surrounding said chamber having smooth walls of low thermal conductivity, a ring for sealing one end of said jacket extending between said walls, a fluid inlet opening into said chamber through said ring, a temperature indicating device extending into said chamber through said ring, a second ring for sealing the other end of said jacket, an outlet for said chamber extending through said second ring, a dipping prism and means for securing a dipping prism in said second ring to seal said chamber.

JOHN W. FORREST.